(No Model.)
P. WENIGMANN.
ELECTRIC BELT.
No. 328,829. Patented Oct. 20, 1885.
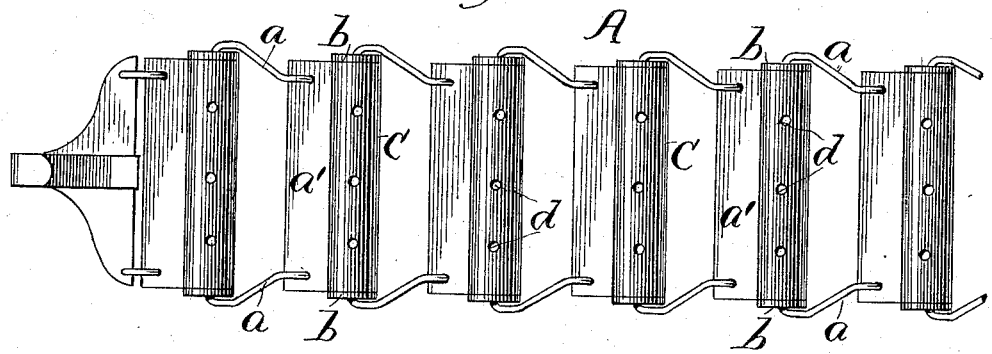
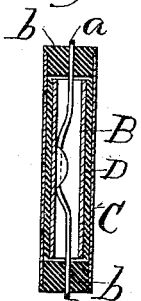 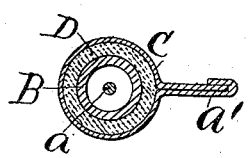 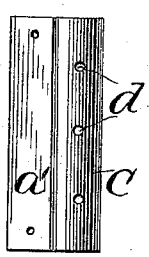
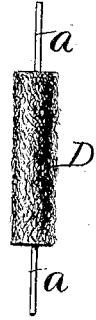 
Witnesses:
Frank J. Blanchard
D. Stanwood
Inventor:
Paul Wenigmann.
By L. B. Coupland & Co
Attorneys

UNITED STATES PATENT OFFICE.

PAUL WENIGMANN, OF CHICAGO, ILLINOIS, ASSIGNOR TO WILLIAM D. CLARK, OF SAME PLACE.

ELECTRIC BELT.

SPECIFICATION forming part of Letters Patent No. 328,829, dated October 20, 1885.

Application filed January 14, 1885. Serial No. 152,832. (No model.)

*To all whom it may concern:*

Be it known that I, PAUL WENIGMANN, of Chicago, county of Cook, and State of Illinois, have invented certain new and useful Improvements in an Electric Belt, of which the following is a full, clear, and exact description, that will enable others to make and use the same, reference being had to the accompanying drawings, forming a part of this specification.

This invention relates to improvements in that class of voltaic electric belts employed as a medicinal agent; and the same consists of certain novel features in the construction and arrangement of the different elements, as will be hereinafter more fully set forth.

Figure 1 shows a portion of a belt embodying my improved features; Fig. 2, a vertical longitudinal section of one of the batteries or cells; Fig. 3, a transverse section of the same; and Figs. 4, 5, 6, and 7 are detached details of construction.

Referring to the drawings, A represents a belt which consists of a number of batteries having proper connection to transmit the electric current with relation to each other. The positive and negative elements of these batteries consist of the inner cylindrical zinc tube, B, open at both ends, and the outer companion cylinder, C, composed of copper. These metallic cylinders are prevented from having contact with each other by means of the interposed felt cylinder D, (shown in Figs. 2, 3, and 6,) which also absorbs and holds the acidulated liquid matter used to excite the electric current.

The wire $a$ used in connecting the different batteries is rigidly secured in the inside of the zinc element, and passes out at each end of the same, as shown in Figs. 2, 6, and 7. The two ends of the wire are secured to each end of the flap $a'$, which forms an integral part of the element C, and projects laterally therefrom. By this means the series of batteries entering into the construction of the belt are secured together, so as to insure a continuous current, and at the same time forms a hinged connection that conveniently permits a proper adjustment of the belt.

The insulating-button $b$ (shown in Fig. 5) is adapted to be inserted in the ends of the element C, the wires $a$ passing through perforations in the center of the same. These buttons are removably inserted, and are provided with the flange $b'$, which prevents them from being forced in too far, and also facilitates their removal when repairs are necessary.

$d$ represents perforations in the element C, through which the charging liquid reaches the felt and zinc cylinders.

This construction presents a larger generating-surface in a belt of the same length than if the elements were flat in the form of plates. It also greatly facilitates repairs, as new zinc cylinders provided with connecting-wires may be conveniently inserted by removing the insulating-buttons from the ends of the copper cylinders and disconnecting the attaching-wires, thus permitting the copper element to be used indefinitely.

I do not strictly confine myself to the use of the metals named, but may use any other material that may be suitable for this purpose.

Having thus described my invention, what I claim, and desire to secure by Letters Patent, is—

In an electric belt, the combination, with the element B, of the connecting-wires $a$, the insulating-buttons $b$, interposed felt cylinder D, and the element C, provided with the flaps $a'$, all combined and arranged as and for the purpose set forth.

PAUL WENIGMANN.

Witnesses.
GEORGE WALTER,
J. B. DONALSON.